US010848537B2

(12) United States Patent
Margolin et al.

(10) Patent No.: US 10,848,537 B2
(45) Date of Patent: Nov. 24, 2020

(54) LEVERAGING AGGREGATED NETWORK STATISTICS FOR ENHANCING QUALITY AND USER EXPERIENCE FOR LIVE VIDEO STREAMING FROM MOBILE DEVICES

(71) Applicant: Google Inc., Mountain View, CA (US)

(72) Inventors: Tomer Margolin, Sunnyvale, CA (US); Daniel Stodolsky, Somerville, MA (US)

(73) Assignee: GOOGLE LLC, Mountain View, CA (US)

( * ) Notice: Subject to any disclaimer, the term of this patent is extended or adjusted under 35 U.S.C. 154(b) by 397 days.

(21) Appl. No.: 15/351,831

(22) Filed: Nov. 15, 2016

(65) Prior Publication Data

US 2018/0139258 A1    May 17, 2018

(51) Int. Cl.
| | | |
|---|---|---|
| *G06F 15/173* | (2006.01) | |
| *H04L 29/06* | (2006.01) | |
| *H04N 21/442* | (2011.01) | |
| *H04N 21/2385* | (2011.01) | |
| *H04N 21/6547* | (2011.01) | |
| *H04N 21/24* | (2011.01) | |
| *H04N 21/658* | (2011.01) | |

(Continued)

(52) U.S. Cl.
CPC ............ *H04L 65/602* (2013.01); *H04L 47/19* (2013.01); *H04L 47/25* (2013.01);
(Continued)

(58) Field of Classification Search
CPC ... H04L 65/602; H04L 65/4069; H04L 47/19; H04L 47/25; H04L 67/06; H04N 21/2385; H04N 21/2402; H04N 21/2408; H04N 21/44209; H04N 21/44227; H04N 21/44245; H04N 21/64738; H04N 21/6547; H04N 21/6582
See application file for complete search history.

(56) References Cited

U.S. PATENT DOCUMENTS 6,850,764 B1 *   2/2005   Patel ..................... H04W 4/029
                                                       455/450
9,514,269 B1 *  12/2016   Bonawitz ................ G06F 30/18
(Continued)

OTHER PUBLICATIONS

PCT Notification of Transmittal of the International Search Report and the Written Opinion of the International Searching Authority for PCT Application No. PCT/US2017/053324, dated Nov. 14, 2017, 14 pages.

*Primary Examiner* — Jonathan A Bui
(74) *Attorney, Agent, or Firm* — Lowenstein Sandler LLP

(57) ABSTRACT

Implementations disclose leveraging aggregated network statistics for enhancing quality and user experience for live video streaming from mobile devices. A method includes receiving, by a processing device of a client device, a bandwidth parameter corresponding to aggregated network statistics for at least one of a current geographic location of the client device or a current network of the client device, initializing an upload quality parameter of an upload session based on the received bandwidth parameter, the upload session comprising upload of content from the client device, and modifying, by the processing device, the upload quality parameter throughout the upload session based on updated bandwidth parameters corresponding to aggregated network conditions for at least one of new geographic locations of the client device or new networks of the client device, the upload quality parameter to control a format of the upload session.

25 Claims, 6 Drawing Sheets

(51) Int. Cl.
*H04N 21/647* (2011.01)
*H04L 12/801* (2013.01)
*H04L 12/825* (2013.01)
*H04L 29/08* (2006.01)

(52) U.S. Cl.
CPC .......... *H04L 65/4069* (2013.01); *H04L 67/06* (2013.01); *H04N 21/2385* (2013.01); *H04N 21/2402* (2013.01); *H04N 21/2408* (2013.01); *H04N 21/44209* (2013.01); *H04N 21/44227* (2013.01); *H04N 21/44245* (2013.01); *H04N 21/64738* (2013.01); *H04N 21/6547* (2013.01); *H04N 21/6582* (2013.01)

(56) References Cited

U.S. PATENT DOCUMENTS

| | | | |
|---|---|---|---|
| 10,110,694 B1 * | 10/2018 | Watson | H04L 65/4092 |
| 2010/0058405 A1 * | 3/2010 | Ramakrishnan | H04N 7/17318 725/97 |
| 2014/0086073 A1 * | 3/2014 | Baykal | H04L 41/5038 370/252 |
| 2014/0365556 A1 * | 12/2014 | Rehan | H04L 65/60 709/203 |
| 2015/0081617 A1 * | 3/2015 | Shaik | G06Q 30/0201 707/602 |
| 2015/0263816 A1 * | 9/2015 | Hinman | H04W 52/04 370/280 |
| 2015/0281710 A1 * | 10/2015 | Sievert | H04N 21/4424 375/240.02 |
| 2015/0282180 A1 * | 10/2015 | Owen | H04L 41/5025 370/329 |
| 2016/0196852 A1 * | 7/2016 | Sievert | G11B 27/3027 386/241 |
| 2016/0234303 A1 * | 8/2016 | Liu | H04L 67/104 |
| 2017/0078680 A1 * | 3/2017 | Coward | H04N 19/177 |
| 2018/0213243 A1 * | 7/2018 | Liu | H04N 5/77 |
| 2020/0015121 A1 * | 1/2020 | Misra | H04W 24/02 |

* cited by examiner

LEVERAGING AGGREGATED NETWORK STATISTICS FOR ENHANCING QUALITY AND USER EXPERIENCE FOR LIVE VIDEO STREAMING FROM MOBILE DEVICES

TECHNICAL FIELD

This disclosure relates to the field of content item streaming and, in particular, to leveraging aggregated network statistics for enhancing quality and user experience for live video streaming from mobile devices.

BACKGROUND

The streaming of multimedia (e.g., videos) to and/or from a client device over a network may be based on adaptive bitrate streaming. For example, bandwidth and processing capability of the client device may be detected in real time. In response to a change of the detected bandwidth and processing capability, the video stream provided to and/or accessed by the client device may be adjusted accordingly. As an example, a video may be encoded at different bitrates. The client device may switch from a first encoding of the video to a second encoding of the video in response to the changing bandwidth and/or capabilities of the client device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a processing device of a client device, a bandwidth parameter corresponding to aggregated network statistics for at least one of a current geographic location of the client device or a current network of the client device, initializing an upload quality parameter of an upload session based on the received bandwidth parameter, the upload session comprising upload of content from the client device, and modifying, by the processing device, the upload quality parameter throughout the upload session based on updated bandwidth parameters corresponding to aggregated network conditions for at least one of new geographic locations of the client device or new networks of the client device, the upload quality parameter to control a format of the upload session.

In one implementation, the aggregated network statistics include measurements corresponding to prior network transactions, the measurements aggregated over a time period and grouped into a plurality of elements. In addition, the measurements corresponding to the prior network transactions may be based on transactions occurring as part of at least one of prior downloads associated with a plurality of client devices or prior uploads associated with the plurality of client devices. Furthermore, the upload quality parameter may include at least one of a bitrate, a resolution, a frame rate, or a compression parameter for the content.

In some implementations, the streaming session is a live video upload session. In some implementations, the upload session is a stored video upload session. The upload session may be transmitted from the client device to a server device of a content sharing platform. In one implementation, the server device transmits the content of the upload session to one or more other client devices responsive to requests to view the content of the upload session.

The method may further include modifying the upload video quality further comprises iteratively modifying the upload quality parameter responsive to successful adaptation of the upload quality parameter based on the bandwidth parameter. In one implementation, modifying the upload quality parameter is performed responsive to a change in at least one of the current geographic location or the current network of the client device. Furthermore, modifying the upload quality parameter may be performed responsive to passage of a periodic time interval. In addition, the current network may include at least one of a type of the current network or an identifier of the current network.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The disclosure is illustrated by way of example, and not by way of limitation, in the figures of the accompanying drawings.

DETAILED DESCRIPTION

Figure 1:
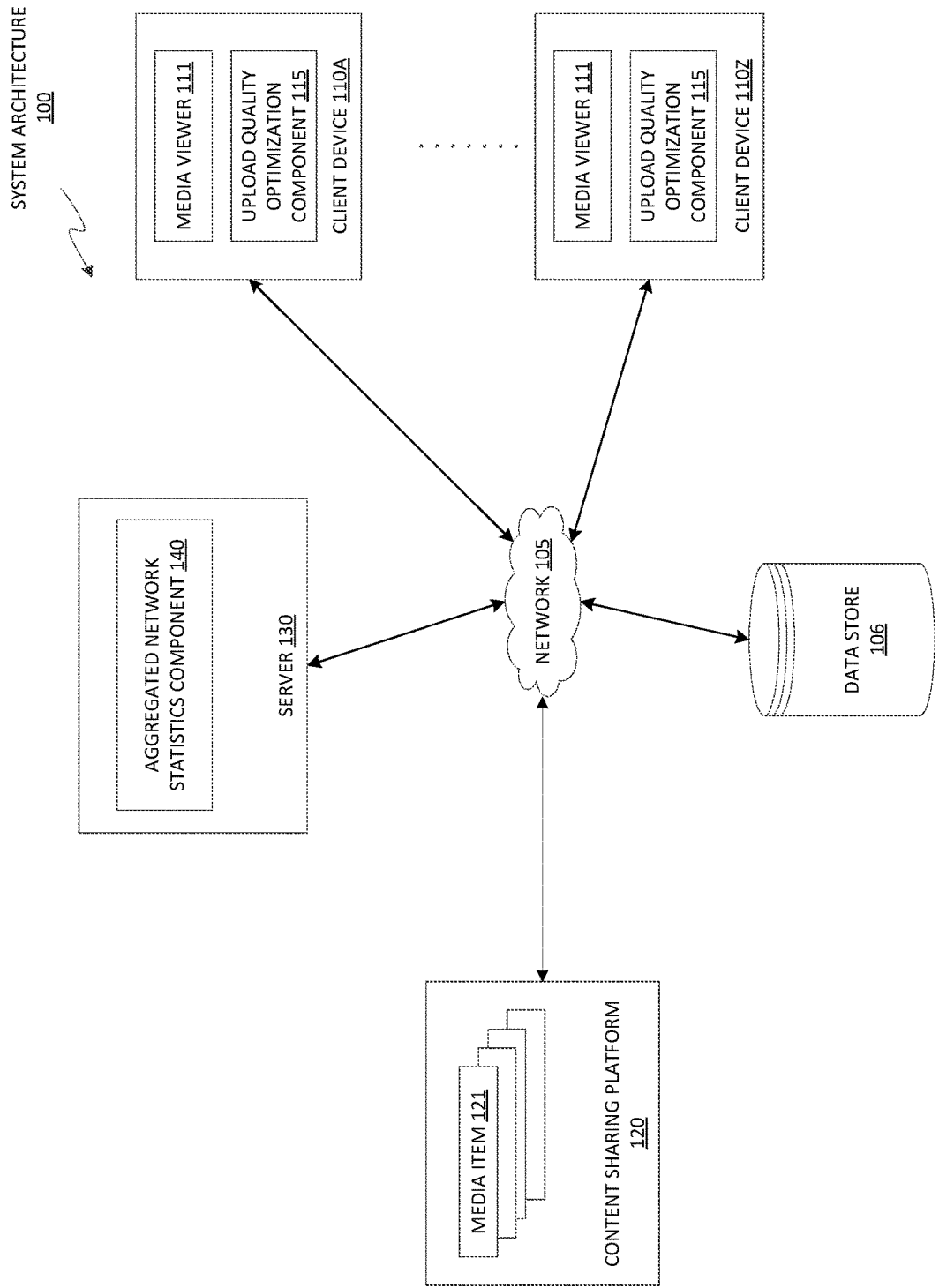
FIG. 1 is a block diagram illustrating an exemplary network architecture in which implementations of the disclosure may be implemented.

Aspects and implementations of the disclosure are described for leveraging aggregated network statistics for enhancing quality and user experience for live video streaming from mobile devices. Adaptive bitrate streaming may be used on a download basis (also referred to as download side) to stream multimedia (e.g., a video) from a server to a client system (e.g., a media player on a client device) over a network. Adaptive bitrate streaming may also be used on an upload basis (also referred to as upload side) to stream multimedia (e.g., a video) from a client system to a server over a network. One example of utilizing adaptive bitrate streaming on the upload side is for live streaming of a multimedia (e.g., live video streaming) from a broadcasting client device (also referred to as a "client device").

The adaptive video streaming system enables the iterative selection from several versions of different encoding bitrates, resolutions, and frame rates with which to encode a source video. The versions of different encoding bitrates, resolutions, and frame rates allows the client system (whether uploading or downloading) to adaptively-select appropriate encoded versions according to the network bandwidth and device capabilities during the video streaming. For example, a media player of a client device may switch from a first encoding of a video to a second encoding of the video in response to changing conditions (e.g., CPU, network bandwidth, etc.) associated with the client device.

This switching between quality levels or formats of a video may result in a video (or individual segments of the video) being transcoded into multiple resolutions (e.g., 1080p, 720p, 480p, 360p, etc.) by the adaptive video streaming system. Furthermore, each resolution of the video may be encoded at a particular encoding bitrate (also referred to herein as "bitrate"). A bitrate (also referred to herein as encoding bitrate) may refer to an amount of information or data stored in the video. In the context of video streaming, bitrate may refer to a measurement of the number of bits that are transmitted over a set length of time, and can be measured in the number of bits used per playback unit of time. For example, a bitrate in video streaming may vary between 400 kbits/s and 40 MBits/s. In some cases, a higher bitrate correlates to better clarity and/or higher quality of the video presented to a viewer. In addition, the video may be transcoded at a particular frame rate. Frame rate (also known as frame frequency) refers to the frequency (rate) at which an imaging device displays consecutive images called frames. Frame rate may be expressed in frames per second (FPS).

For the example of live video broadcasting from mobile devices, in order to reach an optimum quality video stream, a user device (e.g., client device or broadcasting client device) can adapt to network conditions in real-time and change a video quality of the video stream according to available bandwidth at the user device. Video quality (also referred to as "upload quality" or "upload quality parameter(s)" herein) may be changed by adjusting video format and encoding specifications of the video. The video format and encoding specifications may include, but are not limited to, video bitrate, video resolution, video frame rate, and/or compression parameters of the video, to name a few examples. Compression parameters may refer to encoding techniques and options that can be configured for a particular compression/encoding process applied to the video (e.g., options and techniques (such as I and B-frame related techniques, Instantaneous Decoding Refresh (IDR) interval, IDR frequency, and so on) available in the H.264 video compression standard). Video quality in implementations of the disclosure may refer to other attributes and parameters affecting the compression/encoding process of the video.

To optimize the video quality of the video stream for a live broadcast, the broadcasting client device should be aware of how much bandwidth is available and use as much as possible out of that available bandwidth. This can result in an optimal quality video stream under the given network conditions.

However, the bandwidth available to the broadcasting client device may frequently change. For example, bandwidth may change when the broadcasting client device is moving between cellular towers, moving between Wifi access points, moving from Wifi to cellular, or even without changing networks by crossing a wall, going into a staircase, fluctuating demand on the same Wifi router, and so on. When such changes in bandwidth occur, the broadcasting client device, even when using adaptive bitrate streaming processes, would have to apply a guess/approximation (referred to as an adaptive quality scheme) for what amount of bandwidth to expect in order to set a new video quality for the video.

Conventional adaptive quality schemes iterate through different qualities using different processes until reaching an optimum quality for the new network conditions. During the time that the broadcasting client device spends performing these iterations, the video quality may be damaged and be not optimal. For example, if the broadcasting client device is using less bandwidth than possible, the video quality is not as good as it could be, and if the broadcasting client device is using more bandwidth than possible, the video stream is not transmitted in real-time (i.e., buffering of the video stream occurs as there is not enough data for presenting the video in real time). The technical problem to be solved by implementations of the disclosure is to shorten the iterative process for determining an optimal quality for an upload session (e.g., video stream, streaming session, upload streaming session, stored video upload session, live video upload session, etc.) in order to improve the user experience and to improve the upload quality (e.g., video quality) to be closer to an optimum upload quality in a shorter amount of time. The same problem also exists for selecting an initial upload quality when starting an upload session.

Implementations of the disclosure solve the above-described problems by utilizing aggregated network statistics (of other known network transactions) to determine an estimation of network conditions (referred to herein as network conditions parameter) (e.g., bandwidth) in the geographic location and/or the current network the broadcasting client device (also referred to as a "client device" herein). The current network may refer to a type of the network (e.g., Wifi, 3G, 4G, LTE, etc.) and/or an identifier of the network (e.g., network name, cell tower, etc.). Implementations of the disclosure may iteratively apply a heuristic estimation model (also referred to herein as a heuristic estimation scheme) both at initialization of the upload session when setting an upload quality, and also throughout the upload session to modify the upload quality to adapt to changing geographic locations and/or network conditions of the broadcasting client device. Each time the heuristic estimation model is run, a new estimation of network conditions is obtained utilizing aggregated network statistics for the current network and/or geographic location of the broadcasting client device.

Conventional systems did not consider aggregated network statistics in order to determine optimal quality (e.g., bitrates, resolutions, frame rates, etc.) for upload-side streaming of content. Implementations of the disclosure provide a technical improvement for adaptive streaming systems by improving the efficiency of an iterative process for identifying optimal upload quality at a broadcasting client device. The efficiency is improved by decreasing time spent to obtain an optimal upload quality, thus improving user experience, improving upload quality, reducing processing time, and reducing utilization of processing resources.

The disclosure often references videos for simplicity and brevity. However, the teachings of the disclosure are applied to media items generally and can be applied to various types of content or media items, including for example, video, audio, text, images, program instructions, etc.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for leveraging aggregated network statistics for enhancing quality and user experience for live video streaming from mobile devices.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

It should be noted that functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. As an example, users of the client devices 110A-110Z may each transmit a request to the server 130 over the network 105 to download and/or stream one or more videos stored at the data store 106. In addition, users of client devices 110A-110A may also transmit a request to the server 130 over the network 105 to upload one or more videos stored and/or captured at the client devices 110A-110Z to the server 130.

In one implementation, the transmission of content between the server 130 and client devices 110A-110Z (either download or upload) may be via streaming transmission. Streaming transmission refers to presentation of the content while the content is being delivered. With streaming transmission, the media does not have to be completely received in order to present the content for user viewing, listening, etc. A live streaming transmission may refer to delivery of the content in real-time as events in the content are taking place. Streaming transmission and live streaming transmission may involve a broadcasting client device (also referred to as a client, a client device, a source, a source user, a source client device, a broadcaster, a broadcasting user, a broadcasting user device, a broadcasting client, a creator, a transmitter, all iterations of the above, etc.) generating and/or transmitting the content to a receiving device (e.g., a server device, another client device, etc.).

A server, such as server 130 and/or content sharing platform 120, may act as an intermediary in the streaming transmission and/or live streaming transmission to distribute and deliver the content of the transmission. In some implementations, a streaming transmission and/or live streaming transmission is also referred to a session, an upload session, a streaming session, an upload streaming session, and/or an upload live streaming session, to name a few examples. The discussions here rely on the concept of streaming sessions; however, implementations of the disclosure are applicable to non-streaming content transmissions as well. For example, implementations of the disclosure may be applicable to stored video upload sessions.

In one example, when a request to download and/or stream a video is received at the server 130, adaptive bitrate streaming for a downloading user device may be applied as follows. The data store 106 may store multiple videos where each video is divided into multiple segments. In some implementations, the data store 106 may further include a manifest file that may be transmitted by the server 130 to the client devices 110A-110Z. In some implementations, the manifest file may identify the available representations of the video (e.g., the available resolutions at available bitrates) and the segment boundaries for each segment of the video. The manifest file may be transmitted by the server 130 in response to a request for the streaming of a video in the data store 106 by the client devices 110A-110Z. Each of the client devices 110A-110Z may use the manifest file to switch between encoded versions of a stream from the server 130 based on the available resources (e.g., CPU and bandwidth) of the respective client device 110A-110Z. For example, a first encoded version of the stream of a video may be transmitted from the server 130 to the client device 110A based on the CPU capabilities of the client device 110A and the network bandwidth associated with the client device 110A. Furthermore, a second encoded version of the stream of the same video may be transmitted from the server 130 to a different client device 110Z based on the CPU capabilities of the client device 110Z and the network bandwidth associated with the client device 110Z.

On the upload side, adaptive bitrate streaming may also be similarly implemented (as described above for the download side) when a broadcasting client device (such as client device 110A-110Z) uploads content via an upload streaming session and/or via a live upload streaming session to server 130 and/or content sharing platform 120. When an upload streaming session occurs, the broadcasting client device 110A-110Z may adaptively adjust video format and encoding parameters (such as the bitrate, resolution, frame rate, compression parameters, etc.) (referred to herein as "upload quality", "upload quality parameters", or "video quality") of the uploaded content based on network conditions being experienced at the client device.

In implementations of the disclosure, the client device 110A-110Z may include an upload quality optimization component 115. In one example, the upload quality optimization component 115 is part of media viewer 111. In one example, the upload quality optimization component 115 is separate from the media viewer 111. As part of establishing and maintaining an upload streaming session with content sharing platform 120, the upload quality optimization component 115 may utilize statistical data from past transactions (e.g., between multiple users and the content sharing platform 120) to suggest probable network conditions at the client device 110A-110Z and adjust upload quality parameters (e.g., bitrate, resolution, frame rate, compression parameters, etc. of the content item being uploaded in the upload streaming session) based on the suggested network conditions. This adjustment based on the suggested network conditions can more quickly approach an optimum upload quality for the upload streaming session.

In implementations of the disclosure, the server 130 may include an aggregated network statistics component 140. The aggregated network statistics component 140 provides a network conditions parameter to the upload quality optimization component 115. In one implementation, the network conditions parameter may be in the form of a bandwidth parameter provided by the content sharing platform 120, where the bandwidth parameter represents a statistical measure of bandwidth generally experienced by other client devices when located at a geographic location and/or using a current network (e.g., type of network and/or identifier of network) of the client device 110A-110Z. In some implementations, the statistical measure of the bandwidth parameter includes, but is not limited to, an average, a variance, a median, a percentile, and so on.

The network conditions parameter can be used by the upload quality optimization component 115 to adjust the upload quality parameters of the upload streaming session. As discussed above, the network conditions parameter provided by the aggregated network statistics component 140 suggests probable network conditions at a specific geographic location and/or in a specific current network (e.g., Wifi, 3G, 4G, LTE, etc.) of the client device 110A-110Z. The probable network conditions suggested by the network conditions parameter may be based on statistical data from past transactions (e.g., between multiple users and the content sharing platform 120). For example, the statistical data may include measurements of an amount of time it takes for a user device to download and/or upload a file of a certain size from a geographic location and/or a specific network corresponding to the user device. These measurements are logged by the aggregated network statistics component 140 with other measurements from the same geographic location and/or the same specific network, in order to reach an estimation of network conditions (e.g., represented as bandwidth) in the geographic location and/or specific network.

In some implementations, the upload quality optimization component 115 determines the upload quality parameters for a video based on the aggregated network statistics for the geographic location and/or current network of the client device 110A-110Z. The upload quality parameters may refer to a bitrate, resolution, frame rate, and/or compression parameters of the video. The upload quality optimization component 115 may utilize the network conditions parameter (e.g., bandwidth parameter) provided by the aggregated network statistics components to select initial upload quality parameters based on the network conditions parameter, and to adapt the upload quality parameters of the video more quickly when network and/or geographic conditions of the client device 110A-110Z change during the upload streaming session. In one example, adapting the upload quality parameters more quickly may include adjusting the bitrate, the resolution, the frame rate, and/or compression parameters of the upload streaming session by larger margins (than conventional solutions previously implemented) based on the bandwidth that is representative of the network conditions.

In some implementations, upload quality optimization component 115 of client device 110A-110Z and aggregated network statistics component 140 of server 130 may interact with content sharing platform 120 to provide leveraging aggregated network statistics for enhancing quality and user experience for live video streaming from mobile devices. Although illustrated and described as separate components, upload quality optimization component 115 and aggregated network statistics component 140 may be implemented as a single component at server 130 and/or content sharing platform 120. Further description of the upload quality optimization component 115 and the aggregated network statistics component 140, as well as their specific functions, are described in more detail below with respect to FIG. 2.

Although implementations of the disclosure are discussed in terms of content sharing platforms and leveraging aggregated network statistics for enhancing quality and user experience for live video streaming from mobile devices via content sharing platforms, implementations may also be generally applied to any type of social network providing connections between users. Implementations of the disclosure are not limited to content sharing platforms that provide channel subscriptions to users.

In situations in which the systems discussed here collect personal information about users (e.g., collection of network statistics from media viewers 111, collection of network connectivity data, etc.) or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
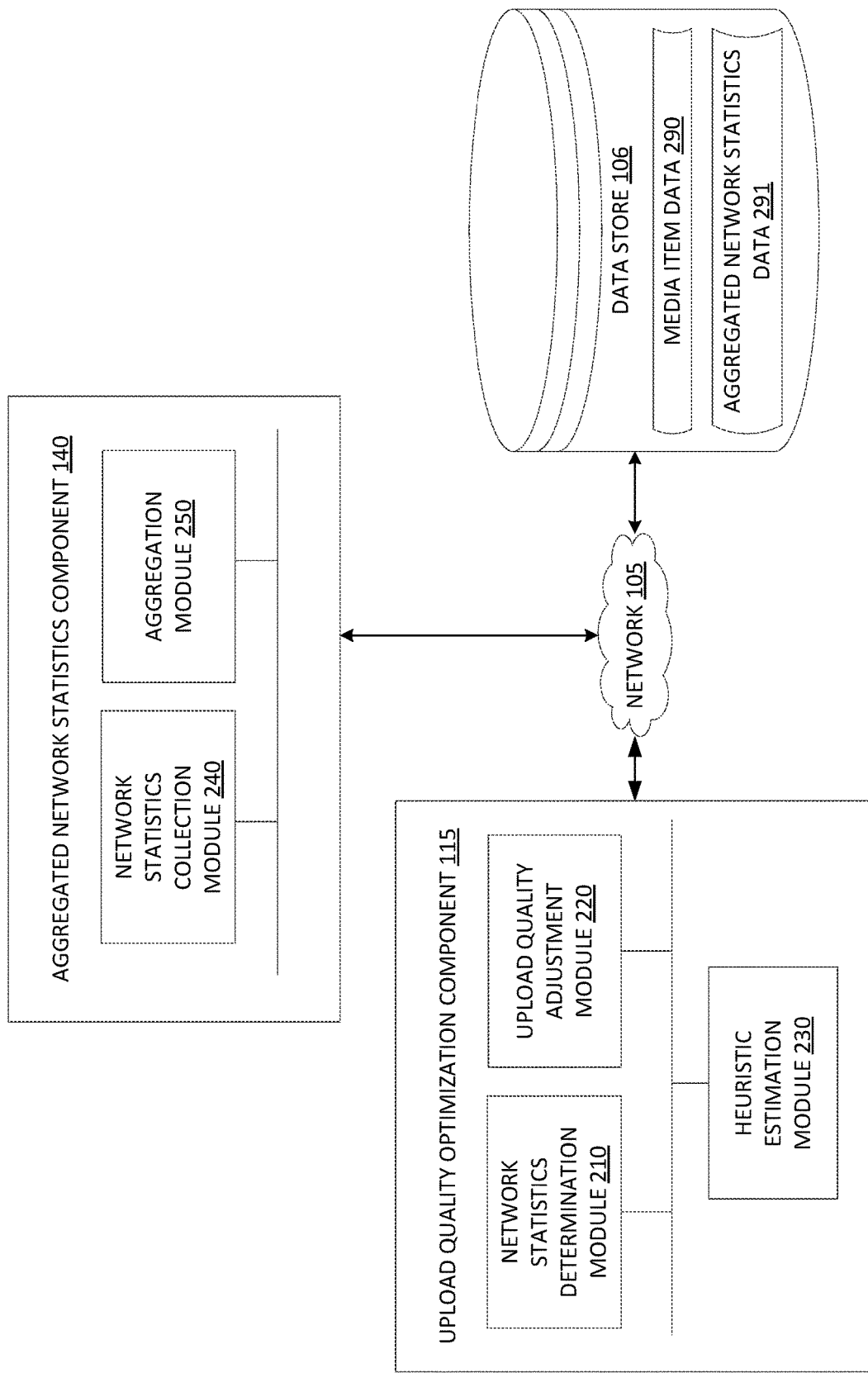
FIG. 2 is a block diagram of an upload quality optimization component and an aggregated network statistics component, in accordance with an implementation of the disclosure.

FIG. 2 is a block diagram illustrating upload quality optimization component 115 and aggregated network statistic component 140 in accordance with one implementation of the disclosure. As discussed above, the upload quality optimization component 115 and aggregated network statistic component 140 may interact with a single social network, or may be utilized among multiple social networks (e.g., provided as a service of a content sharing platform that is utilized by other third party social networks).

In one implementation, the upload quality optimization component 115 includes a network statistics determination module 210, an upload quality adjustment module 220, and a heuristic estimation module 230. In one implementation, the aggregated network statistics component 140 includes a network statistics collection module 240 and an aggregation module 250. More or less components may be included in the upload quality optimization component 115 and/or the aggregated network statistics component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/or external servers.

The upload quality optimization component 115 and/or the aggregated network statistics component 140 are communicatively coupled to the data store 106. For example, the upload quality optimization component 115 and/or aggregated network statistics component 140 may be coupled to the data store 106 via a network (e.g., via network 105 as illustrated in FIG. 1). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290 and aggregated network statistics data 291.

As discussed above, the upload quality optimization component 115 may utilize statistical data from past transactions (e.g., between multiple users and the content sharing platform) to suggest probable network conditions during an upload streaming session (e.g., to a server such as at a content sharing platform). The upload streaming session may be associated with upload and/or streaming of content that may be stored as media item data 290 in data store 106. The upload quality optimization component 115 may utilize the suggested probable network conditions to adjust an upload quality (e.g., bitrate, resolution, frame rate, and/or compression parameters of the content) of the upload streaming session.

The suggested probable network conditions may be in the form of a network conditions parameter. In one example, the network conditions parameter is a bandwidth parameter that is received by the network statistics determination module 210 from the aggregated network statistics component 140. The bandwidth parameter may correspond to a bandwidth value that represents an amount of data transmitted over a period time via a communication session. The bandwidth parameter provided by the aggregated network statistics component 140 may refer to a statistical measurement of bandwidth (e.g., average, median, variance, percentile, etc.) generally experienced by other client devices in other past network transactions occurring at a specific geographic location and/or using a specific current network (e.g., type of network and/or identifier of network) of the client device broadcasting the upload streaming session.

The network statistics determination module 240 may receive the network conditions parameter when initializing the upload streaming session for the broadcasting client device and/or during the course of the upload streaming session (e.g., in response to passage of predetermined time intervals and/or changing network conditions and changing quality of the upload streaming session). In one implementation, the network statistics determination module 210 may request (e.g., a pull model) network conditions parameter and/or may receive (e.g., a push model) the network conditions parameter from the aggregated network statistics component 140.

As part of identifying the network conditions parameter to provide to the network statistics determination module 210, the network statistics collection module 240 may receive statistical data collected from other known network transactions occurring between a server (e.g., content sharing platform) and multiple client devices (may be inclusive of or exclusive of the client device broadcasting the upload streaming session). For example, the statistical data may include measurements of an amount of time it takes for a client device to download and/or upload a file of a certain size from a geographic location and/or a specific network.

Implementations of the disclosure may collect statistical data corresponding to known network transactions involving one or more of download of a file and/or upload of a file.

The collected measurements are logged, along with identifying information of the geographic location and/or network associated with the measurement, by the network statistics collection module 240. In some implementations, measurements within a group of peers in a peer-to-peer (P2P) network may be collected and aggregated at one or more of the peer devices in a similar manner as described above. In some implementations, a third-party server device may collect and aggregate the measurements of known network transactions in a similar manner as described above.

The aggregation module 250 may then aggregate the measurements collected by the network statistics collection module 240 for a same geographic location and/or a same specific network corresponding to the client device broadcasting the upload streaming session. In one implementation, the measurements are aggregated over a time period and grouped into a plurality of elements (e.g., based on geographic location, network, etc.). In some implementations, the measurements may be grouped according to elements other than geographic location and/or network. The measurements grouped according to geographic location and/or network may further be associated with a minimum number of measurements used per group (e.g., 300 measurements to form a group, etc.). In addition, an age of the measurements may be taken into account when determining if and/or how to group measurements (e.g., older measurements may not be as relevant as more recent measurements).

The aggregated measurements may be used by the aggregation module 250 to determine an estimation of network conditions in the geographic location and/or the specific network of the broadcasting client device. As discussed above, the estimation of network conditions may be represented as a statistical measurement of bandwidth (e.g., average, median, variance, percentile, etc.) corresponding to the aggregated measurement. The network conditions parameter may also be in the form of a quality level indicator (e.g., good, average, bad, etc.). In some implementations, the network conditions parameter may be provided for both upstream estimations (corresponding to upload measurements) and downstream estimations (corresponding to download measurements). Although the following description refers to bandwidth and/or bandwidth parameter as the network conditions parameter, other representations are possible and implementations of the disclosure are not limited to bandwidth as the network conditions parameter.

The geographic location and/or network of the broadcasting client device may be provided to the aggregation module 250 (e.g., from the broadcasting client device) as part of an initial request to establish the upload streaming session. Thereafter, the geographic location and/or network of the broadcasting client device may be provided to the aggregation module 250 as part of subsequent communications with the broadcasting client device.

The bandwidth parameter (or any other network conditions parameter representation) corresponding to the aggregated measurements may be provided to the network statistics determination module 210, accordingly. The aggregated measurements (also referred to as aggregated network statistics) and/or corresponding bandwidth parameter may be stored as aggregated network statistics data 291 in data store 106.

In implementations of the disclosure, the upload quality adjustment module 220 may utilize the bandwidth parameter (or any other network conditions representation) provided to the network statistics determination module 210 to initialize and/or adjust upload quality parameters for the upload streaming session of the broadcasting client device. As discussed above, upload quality parameters may refer to a bitrate, resolution, frame rate, and/or compression parameters of the video, for example.

The upload quality adjustment module 220 may implement an upload quality determination process to identify optimum upload quality parameters) to select for the upload streaming session. The upload quality determination process for selecting the optimal upload quality parameters may include iterative processes, such as random early detection (RED), and/or other schemes for searching for optimum upload quality parameters, such as a binary search. In one implementation, the upload quality determination process may utilize the heuristic estimation module 230 to implement a heuristic estimation scheme (also referred to as heuristic estimation model). The heuristic estimation scheme may refer to an iterative process that generates a sequence of improving approximate solutions for a class of problems, in which the $n^{th}$ approximation is derived from the previous ones.

In one implementation, the upload quality adjustment module 220 may utilize the bandwidth parameter (provided by the aggregated network statistic component 140) for the current geographic location and/or the current network of the broadcasting client device in order to select initial upload quality parameters (e.g., bitrate, resolution, frame rate, and/or compression parameters) for the upload streaming session. The heuristic estimation module 230 may receive as input the bandwidth parameter and utilize the bandwidth parameter to select the initial upload quality parameters that would provide an optimal upload quality at the bandwidth (e.g., upload quality that minimizes buffering while maximizing upload quality). In one implementation, the broadcasting client device may be configured with upload qualities that correspond to each bandwidth parameter. As such, when a specific bandwidth parameter is received, the corresponding configured upload quality parameters are selected for the broadcasting client device.

The initial selected upload quality parameters may then be used as a starting point for the heuristic estimation scheme of the heuristic estimation module 230. In this regard, the upload quality adjustment module 220 may also utilize the bandwidth parameter for the geographic location and/or the network of the broadcasting client device to adapt the upload quality parameters of the video when the geographic location and/or the network of the broadcasting client device change during the upload streaming session. For example, the broadcasting client device may experience changing networking conditions due to a change in location of the broadcasting client device (and thus a change in the current network used by the broadcasting client device) and/or due to other interferences with the network at the broadcasting client device (additional demand from other devices degrading local network bandwidth, etc.)

Such changing network conditions and/or changing geographic locations of the broadcasting client device may trigger the heuristic estimation module 230 to run the heuristic estimation scheme at the broadcasting client device in order to determine whether the upload quality parameters should be adjusted by the upload quality adjustment module 220. In some implementations, the heuristic estimation module 230 may also run the heuristic estimation scheme at periodic time intervals to determine whether the upload quality parameters should be adjusted by the upload quality adjustment module 220. Each time that the heuristic estimation scheme is run by the heuristic estimation module 230, an updated bandwidth parameter is obtained (i.e., retrieved from and/or provided by) from the aggregated network statistics module 140 based on the current geographic location and/or current network of the broadcasting client device.

In one example, adapting the upload quality parameters may include the heuristic estimation module 230 more aggressively tuning the heuristic estimation scheme. For example, the heuristic estimation scheme may aggressively increase quality up (e.g., by larger amounts than previous conventional solutions) to the bandwidth parameter, or aggressively decrease quality down to the bandwidth parameter. In one implementation, iteration parameters may be configured for the heuristic estimation scheme of the upload quality determination process. The iteration parameters may include a factor used to adjust the heuristics estimation scheme at each iteration, as described in further detail below.

In furtherance of this example, the heuristic estimation module 230 may configure the upload streaming session with an upload quality that utilizes a bandwidth X (e.g., the upload quality adjustment module 220 sets the upload quality at a bitrate and a resolution consistent with bandwidth X). If the bitrate/resolution chosen for the bandwidth X results in the upload streaming session producing satisfactory upload quality results (e.g., no failures such as unacceptable buffering, etc.), then the heuristics estimation module 230 would then increase the bandwidth X by a factor of Y and adjust the upload quality (e.g., bitrate/resolution) accordingly. For example, if X*Y<the bandwidth (provided by the aggregated network statistics component 140), the heuristic estimation module 230 may increase Y to a larger number, and thus more aggressively tune the heuristic estimation scheme. Other approaches to tuning the heuristic estimation scheme may be utilized in implementations of the disclosure in addition to the above-described tuning approaches. As a result of the intelligent tuning of the heuristic estimation scheme based on network statistics from prior known network transactions, the heuristic estimation module 230 can reduce an amount of time to identify an optimum upload quality for an upload streaming session at a broadcasting client device (by increasing/decreasing upload quality by increasingly larger margins toward the known bandwidth).

Figure 3:
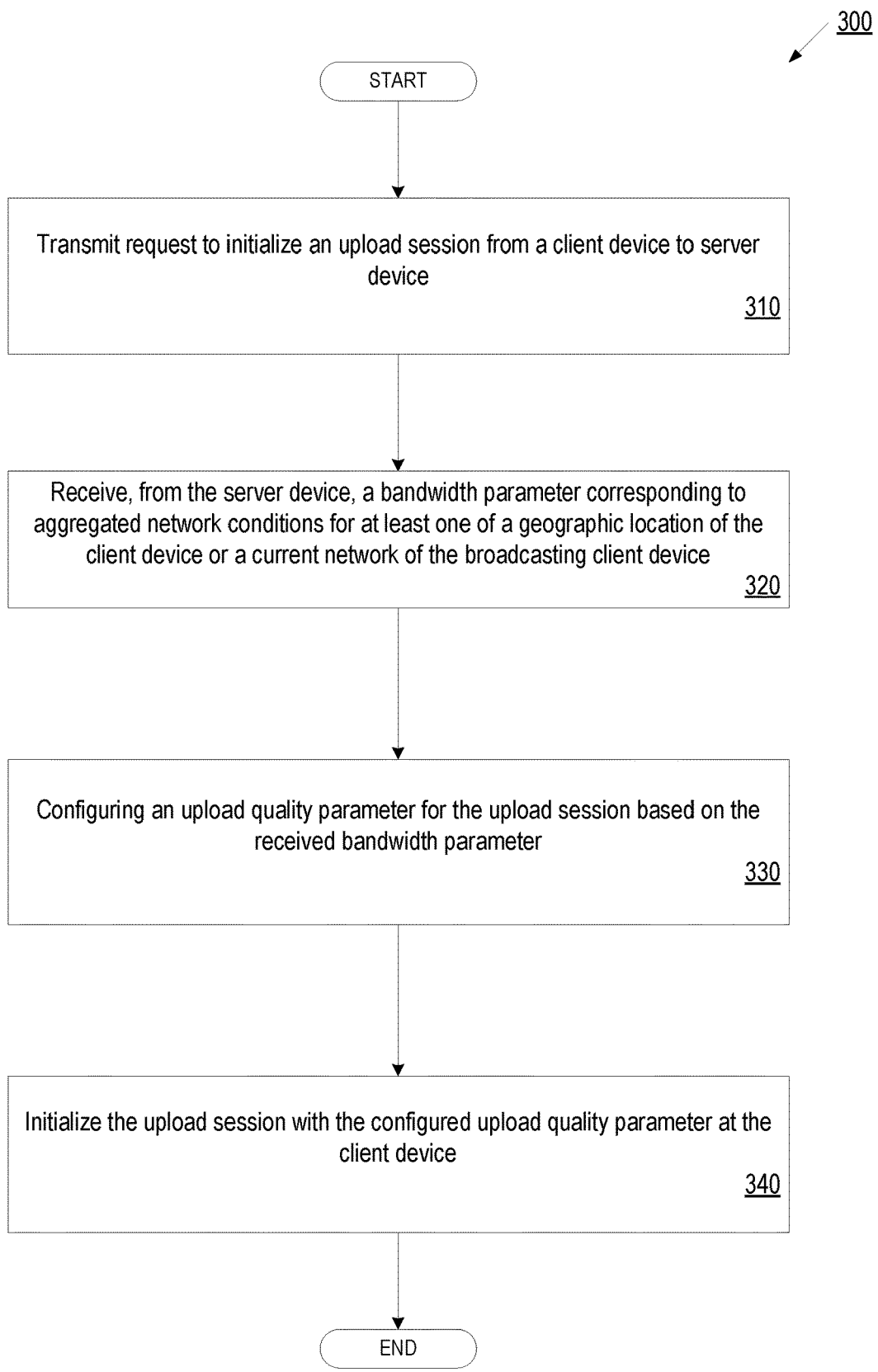
FIG. 3 is a flow diagram illustrating a method for initializing upload quality of an upload session based on aggregated network statistics, according to an implementation.

FIG. 3 is a flow diagram illustrating a method 300 for initializing upload quality of an upload session based on aggregated network statistics, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art should understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by upload quality optimization component 115 as shown in FIG. 2.

Method 300 begins at block 310 where a request is transmitted to initialize an upload session from a client device to a server device. At block 320, a bandwidth parameter is received from the server device. The bandwidth parameter may correspond to aggregated network conditions for a geographic location of the broadcasting client device and/or a current network (e.g., type of network and/or identifier of network) of the broadcasting client device. Subsequently, at block 330, an upload quality parameter for the upload session is configured based on the received bandwidth parameter. In one implementation, the client device may be configured with upload quality parameters (e.g., bitrate, resolution, frame rate, and/or compression parameters) that correspond to each bandwidth parameter. As such, when a specific bandwidth parameter is received, the corresponding configured upload quality parameter is selected for the client device. Lastly, at block 340, the upload session is initialized with the configured upload quality parameter at the client device.

Figure 4:
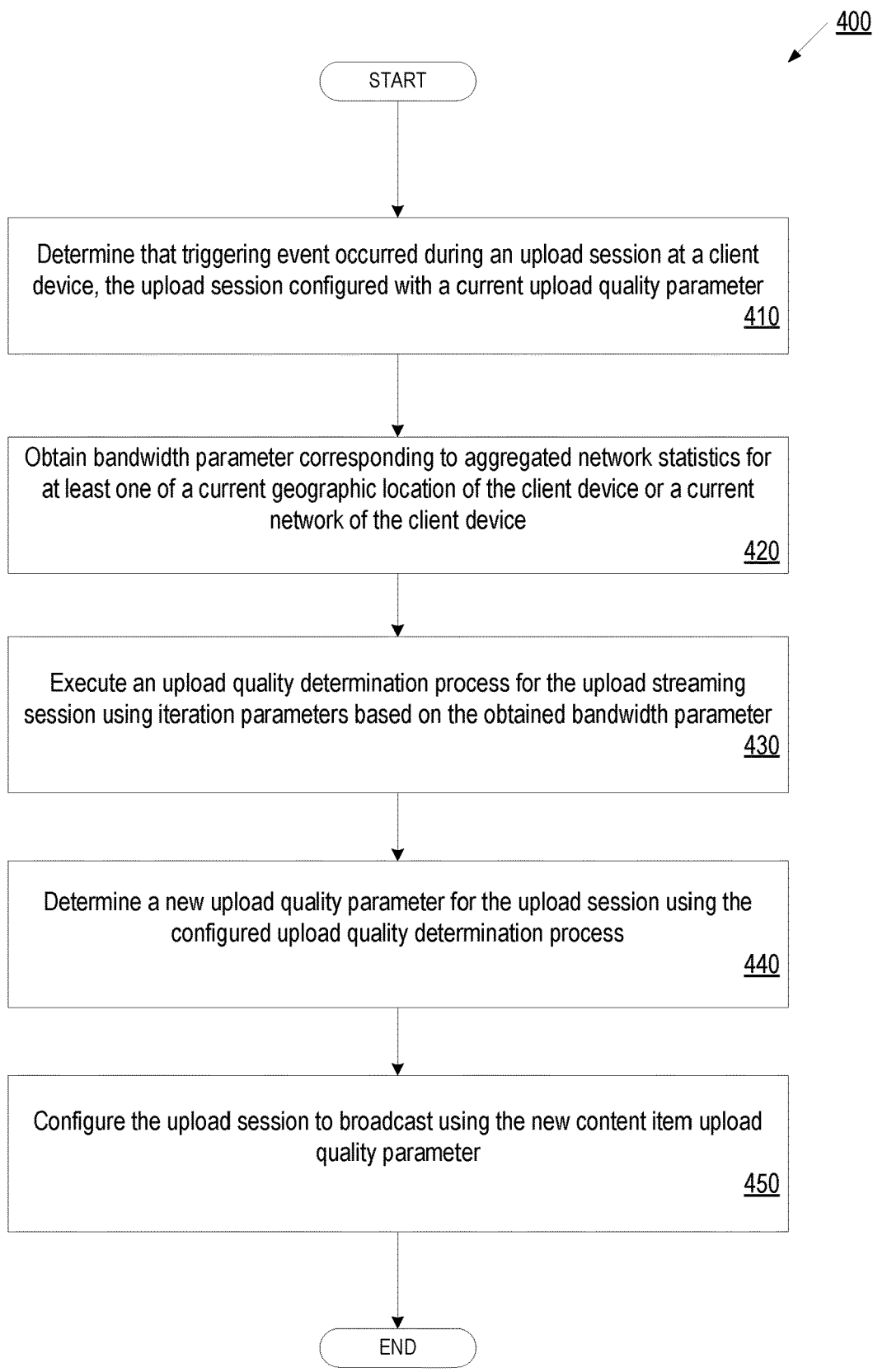
FIG. 4 is a flow diagram illustrating a method adjusting upload quality of an upload session based on aggregated network statistics, according to an implementation.

FIG. 4 is a flow diagram illustrating a method 400 for adjusting upload quality of an upload session based on aggregated network statistics, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by upload quality optimization component 115 as shown in FIG. 2.

Method 400 begins at block 410 where the processing logic determines that a triggering event has occurred during an upload session at a client device. The triggering event may include the expiration of a time interval (e.g., determined time interval configured at the client device; for example, every 10 seconds), a change in geographic location or network (e.g., change in type of network or change in network identifier) of the client device, and/or a failure in upload quality (e.g., buffering, etc.) at the client device. In one implementation, the upload session is configured with a current upload quality parameter (e.g., bitrate, resolution, frame rate, and/or compression parameters).

At block 420, a bandwidth parameter corresponding to aggregated network statistics for a current geographic location of the client device and/or a current network of the client device is obtained. At block 430, an upload quality determination process for the upload session is executed utilizing iteration parameters based on the obtained bandwidth parameter. Subsequently, at block 440, a new upload quality parameter for the upload session is determined using the configured upload quality determination process. The upload quality parameters may include a bitrate, resolution, frame rate, and/or compression parameters configured for the upload session. In one implementation, the client device may be configured with upload quality parameters that correspond to each bandwidth parameter. As such, when a specific bandwidth parameter is received, the corresponding configured upload quality parameter is selected for the client device. Lastly, at block 450, the upload session is configured to broadcast using the new upload quality parameter.

Figure 5:
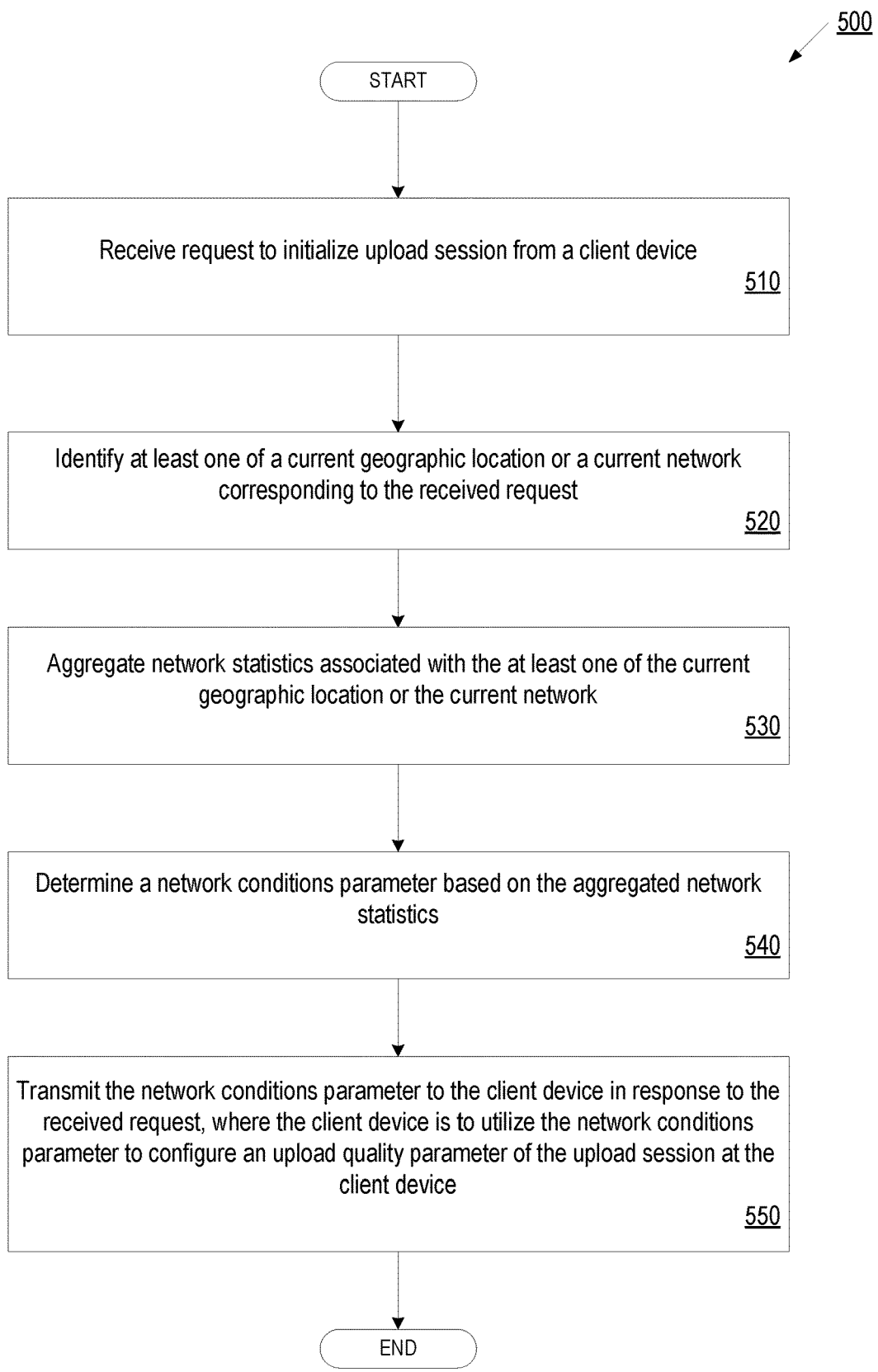
FIG. 5 is a flow diagram illustrating a method for a server device to generate aggregated network statistics used for enhancing quality and user experience for an upload session, according to an implementation.

FIG. 5 is a flow diagram illustrating a method 500 for a server device to generate aggregated network statistics used for enhancing quality and user experience for an upload session, according to an implementation of the disclosure.

The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by aggregated network statistics component 140 as shown in FIG. 2.

Method 500 begins at block 510 where a request is received to initialize an upload session. The request may be received from a client device that is requesting to transmit content to the server device via the upload session. At block 520, a current geographic location and/or a current network (e.g., type of network and/or identifier of network) of the client device of the received request are identified. In one implementation, the current geographic location and/or the current network may be included as information in the received request. In other implementations, the server device may request this information from the client device.

Subsequently, at block 530, network statistics associated with the current geographic location and/or the current network of the client device are aggregated. The network statistics may refer to measurements of an amount of time it takes for a user device to download and/or upload a file of a certain size from a geographic location and/or a specific network corresponding to the user device. The aggregation of the network statistics may provide an approximation of network conditions for the specific geographic location and/or network. At block 540, a network conditions parameter is determined based on the aggregated network statistics. In one implementation, the network conditions parameter is a bandwidth parameter corresponding to the aggregated network statistics. The bandwidth parameter may be an average bandwidth, median bandwidth, variance of bandwidth, percentile of bandwidth, etc., corresponding to the aggregated measurements. Lastly, at block 550, the network conditions parameter is transmitted to the client device in response to the received request. The client device may utilize the network conditions parameter to adjust an upload quality parameter of the upload session at the broadcasting client device.

Figure 6:
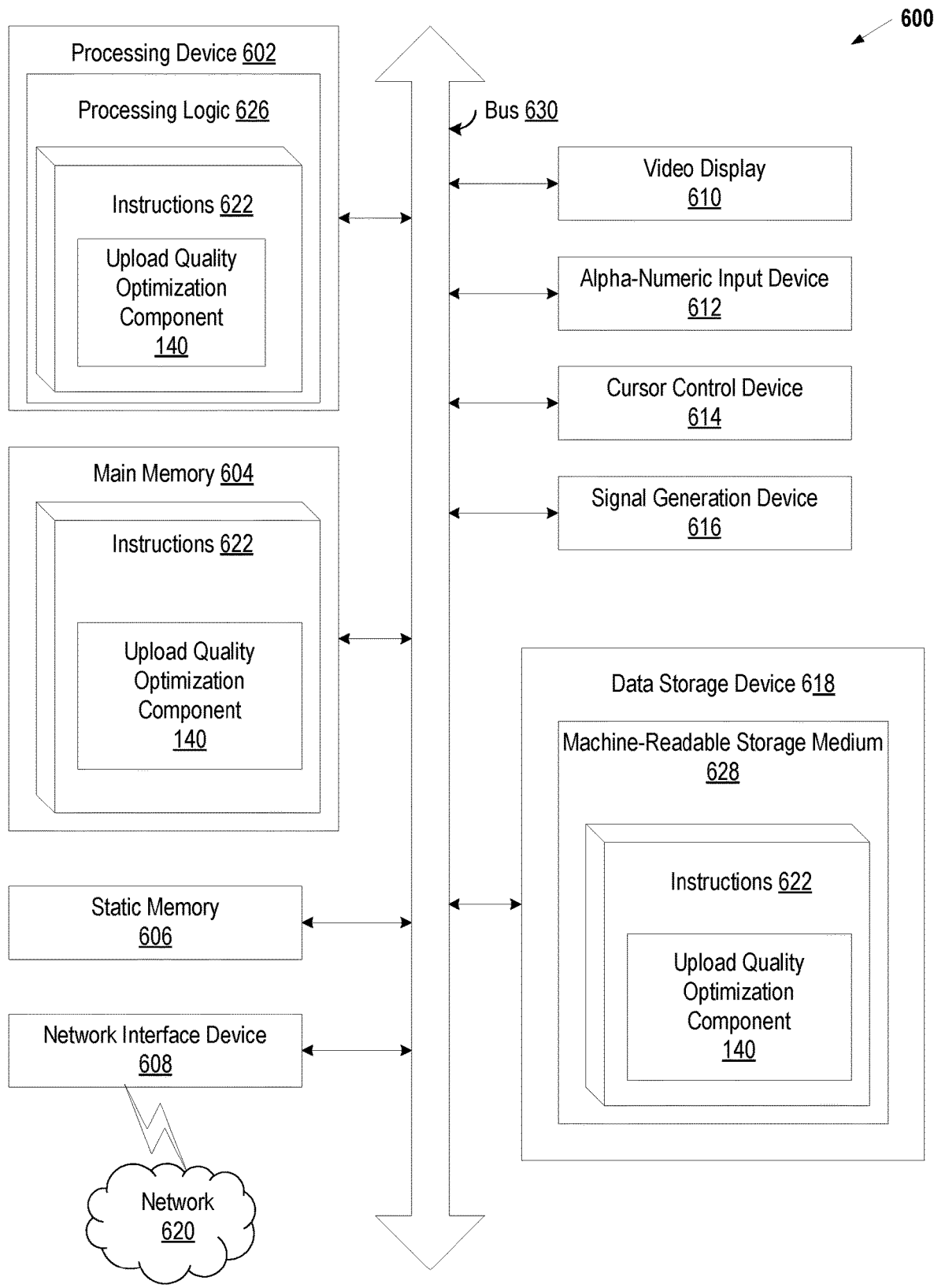
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a client device, such as client device 110A-110Z, executing an upload quality optimization component 140, as described with respect to FIGS. 1 and 2. In another implementation, computer system 600 may be representative of a server device, such as server device 102, executing an upload quality optimization component 140, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for leveraging aggregated network statistics for enhancing quality and user experience for live video streaming from mobile devices, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the disclosure. It should be apparent to one skilled in the art, however, that at least some implementations of the disclosure may be practiced without these specific details. In other instances, well-known components or methods are not described in detail or are presented in simple block diagram format in order to avoid unnecessarily obscuring the disclosure. Thus, the specific details set forth are merely exemplary. Particular implementations may vary from these exemplary details and still be contemplated to be within the scope of the disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
    receiving, by a processing device of a client device, a bandwidth parameter derived from aggregated network statistics for bandwidth experienced by other client devices separate from the client device, wherein the other client devices are at least one of located in a current geographic location of the client device or located in a current network of the client device, the current geographic location determined based on first identifying information of the geographic location collected with the aggregated network statistics, and the current network determined based on second identifying information of the current network collected with the aggregated network statistics;
    initializing, by the processing device of the client device, an upload quality parameter of an upload session based on the received bandwidth parameter derived from the aggregated network statistics for the bandwidth experienced by the other client devices, the upload session comprising upload of content from the client device, wherein the upload quality parameter comprises bitrate and resolution for the content; and
    modifying, by the processing device of the client device, the upload quality parameter throughout the upload session based on updated bandwidth parameters derived from aggregated network conditions for bandwidth experienced by the other client devices corresponding to at least one of new geographic locations of the client device or new networks of the client device, the upload quality parameter to control a format of the upload session.

2. The method of claim 1, wherein the aggregated network statistics comprise measurements corresponding to prior network transactions, the measurements aggregated over a time period and grouped into a plurality of elements.

3. The method of claim 2, wherein the measurements corresponding to the prior network transactions are based on transactions occurring as part of at least one of prior downloads associated with the other client devices or prior uploads associated with the other client devices.

4. The method of claim 1, wherein the upload quality parameter further comprises a compression parameter for the content.

5. The method of claim 1, wherein the upload session is a live video upload session.

6. The method of claim 1, wherein the upload session is a stored video upload session.

7. The method of claim 1, wherein the upload session is an upload streaming session.

8. The method of claim 1, wherein the upload session is transmitted from the client device to a server device of a content sharing platform, and wherein the server device transmits the content of the upload session to one or more receiving client devices responsive to requests to view the content of the upload session.

9. The method of claim 1, wherein modifying the upload video quality further comprises iteratively modifying the upload quality parameter responsive to successful adaptation of the upload quality parameter based on the bandwidth parameter.

10. The method of claim 1, wherein modifying the upload quality parameter is performed responsive to a change in at least one of the current geographic location or the current network of the client device.

11. The method of claim 1, wherein modifying the upload quality parameter is performed responsive to passage of a periodic time interval.

12. The method of claim 1, wherein the current network comprises at least one of a type of the current network or an identifier of the current network.

13. A non-transitory machine-readable storage medium storing instructions which, when executed, cause a processing device to perform operations comprising:
    receiving a request to initialize an upload session from a client device;
    identifying at least one of a current geographic location and a current network of the client device;
    aggregating, by the processing device, network statistics associated with bandwidth experienced by other client devices separate from the client device, wherein the other client devices are at least one of located in the current geographic location or located in the current network;
    deriving, by the processing device, a network conditions parameter from the aggregated network statistics for the bandwidth experienced by the other client devices; and
    transmitting, to the client device in response to the received request, the network conditions parameter, derived from the aggregated network statistics for the bandwidth experienced by the other client devices, to cause an upload quality parameter of the upload session at the client device to be configured based on the network conditions parameter, the upload quality parameter to control a format of the upload session and comprising a bitrate and a resolution of the upload session.

14. The non-transitory machine-readable storage medium of claim 13, wherein the received request comprises the at least one of the current geographic location and the current network of the client device.

15. The non-transitory machine-readable storage medium of claim 13, wherein the network conditions parameter comprises at least one of an upload bandwidth corresponding to the aggregated network statistics or download bandwidth corresponding to the aggregated network statistics.

16. The non-transitory machine-readable storage medium of claim 13, wherein the upload quality parameter further comprises a compression parameter of the upload session.

17. The non-transitory machine-readable storage medium of claim 13, wherein the operations further comprise transmitting content of the upload session to one or more receiving client devices responsive to requests to access the content of the upload session from the one or more receiving client devices.

18. The non-transitory machine-readable storage medium of claim 13, wherein the operations further comprise:
    receiving, from the client device, an update request for a new network conditions parameter;
    identifying at least one of a new current geographic location or a new current network of the client device;
    aggregating the network statistics associated with the at least one of the new current geographic location or the new current network;
    determining the new network conditions parameter based on the aggregated network statistics associated with the at least one of the new current geographic location or the new current network; and
    transmitting, to the client device, the new network conditions parameters in response to the received update request, wherein the upload quality parameter of the upload session is adjusted based on the new network conditions parameter.

19. The non-transitory machine-readable storage medium of claim 13, wherein the aggregated network statistics comprise measurements corresponding to prior network transactions, the measurements aggregated over a time period and grouped into a plurality of elements.

20. The non-transitory machine-readable storage medium of claim 13, wherein the current network comprises at least one of a type of the current network or an identifier of the current network.

21. A system for a client device, the system comprising:
a memory; and
a processing device coupled to the memory, wherein the processing device is to:
    obtain a bandwidth parameter derived from aggregated network statistics for bandwidth experienced by other client devices separate from the client device, wherein the other client devices are at least one of located in a current geographic location of the client device or located in a current network of the client device, the current geographic location determined based on first identifying information of the geographic location collected with the aggregated network statistics, and the current network determined based on second identifying information of the current network collected with the aggregated network statistics;
    initialize an upload video quality parameter of an upload video streaming session at the client device based on the received bandwidth parameter derived from the aggregated network statistics for the bandwidth experienced by the other client devices, the upload video streaming session comprising upload of a video from the client device to a server device, the upload video quality parameter to control a format of the video in the upload video streaming session and comprises a bitrate and a resolution of the upload video streaming session; and
    adjust the upload video quality parameter throughout the upload video streaming session based on updated bandwidth parameters derived from aggregated network statistics for bandwidth experienced by other client devices corresponding to at least one of a new geographic locations or new networks of the client device.

22. The system of claim 21, wherein the aggregated network statistics comprise measurements corresponding to prior network transactions, the measurements aggregated over a time period and grouped into a plurality of elements.

23. The system of claim 21, wherein the upload video quality parameter further comprises a compression parameter for the content.

24. The system of claim 21, wherein modifying the upload video quality parameter further comprises iteratively modifying the upload video quality parameter responsive to successful adaptation of the upload video quality parameter based on the bandwidth parameter.

25. The system of claim 21, wherein the current network comprises at least one of a type of the current network or an identifier of the current network.

* * * * *